US010156727B2

(12) United States Patent
Miller et al.

(10) Patent No.: US 10,156,727 B2
(45) Date of Patent: *Dec. 18, 2018

(54) ADJUSTABLE STRAP SYSTEM FOR HEAD-MOUNTED DISPLAYS

(71) Applicant: FACEBOOK TECHNOLOGIES, LLC, Menlo Park, CA (US)

(72) Inventors: Robin Michael Miller, Redmond, WA (US); Jared I. Drinkwater, Auburn, WA (US); Lesley Ribble Magrath, Seattle, WA (US); Peter Wesley Bristol, Seattle, WA (US); Joseph Patrick Sullivan, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,679

(22) Filed: Nov. 3, 2017

(65) Prior Publication Data

US 2018/0059424 A1 Mar. 1, 2018

Related U.S. Application Data

(63) Continuation of application No. 14/835,390, filed on Aug. 25, 2015, now Pat. No. 9,810,911.

(60) Provisional application No. 62/180,008, filed on Jun. 15, 2015.

(51) Int. Cl.
*G02B 27/00* (2006.01)
*G02B 27/01* (2006.01)
*F16M 13/00* (2006.01)

(52) U.S. Cl.
CPC ......... *G02B 27/0176* (2013.01); *F16M 13/00* (2013.01); *H05K 999/99* (2013.01)

(58) Field of Classification Search
CPC ... F16M 13/00; G02B 27/0176; H05K 999/99
USPC ........................................... 224/181
See application file for complete search history.

(56) References Cited

U.S. PATENT DOCUMENTS

| 4,457,461 | A | * | 7/1984 | Docking | G12B 9/08 |
| | | | | | 2/422 |
| 5,179,735 | A | * | 1/1993 | Thomanek | F16M 13/04 |
| | | | | | 2/421 |
| 5,276,471 | A | * | 1/1994 | Yamauchi | G02B 27/0176 |
| | | | | | 345/8 |

(Continued)

OTHER PUBLICATIONS

Miller, Notice of Allowance, U.S. Appl. No. 14/835,390, dated Jul. 13, 2017, 8 pgs.

*Primary Examiner* — Peter Helvey
(74) *Attorney, Agent, or Firm* — Morgan, Lewis & Bockius LLP

(57) ABSTRACT

A strap system for a head-mounted display system includes a rigid bar having an opening at a first end and a vertical slot situated on an outer surface of the rigid bar. The opening extends within the rigid bar in a lateral dimension. The strap system also includes a rigid segment with an end inserted into the opening of the rigid bar in the lateral dimension, one or more compression springs coupled to the rigid segment, a shuttle to press against the one or more compression springs so as to slide along the lateral dimension, and an adjustment strap fixedly coupled to the shuttle and extending beyond the end of the rigid segment and through the vertical slot on the rigid bar.

15 Claims, 4 Drawing Sheets

(56) References Cited

U.S. PATENT DOCUMENTS

| | | | | |
|---|---|---|---|---|
| 5,321,416 A * | 6/1994 | Bassett | ............... | A42B 3/145 |
| | | | | 345/8 |
| 5,469,578 A * | 11/1995 | Mattes | ............... | G02B 23/125 |
| | | | | 2/6.7 |
| 5,671,037 A * | 9/1997 | Ogasawara | ....... | G02B 27/0176 |
| | | | | 2/421 |
| 7,484,646 B1 * | 2/2009 | Holmes | ............... | B63C 11/12 |
| | | | | 2/422 |
| 8,814,691 B2 * | 8/2014 | Haddick | ............ | G02B 27/017 |
| | | | | 463/30 |
| 2006/0225187 A1 * | 10/2006 | Wu | ................. | A42B 3/145 |
| | | | | 2/425 |
| 2010/0327028 A1 * | 12/2010 | Nakabayashi | ........ | A42B 1/247 |
| | | | | 224/162 |
| 2011/0127305 A1 * | 6/2011 | Yates | ................... | G02B 7/002 |
| | | | | 224/181 |
| 2012/0280007 A1 * | 11/2012 | Nakabayashi | .... | G02B 27/0176 |
| | | | | 224/181 |
| 2013/0327909 A1 * | 12/2013 | Freelander | ............. | A45F 5/00 |
| | | | | 248/224.7 |

* cited by examiner

ADJUSTABLE STRAP SYSTEM FOR HEAD-MOUNTED DISPLAYS

RELATED APPLICATIONS

This application is a continuation of U.S. Non Provisional application Ser. No. 14/835,390, filed Aug. 25, 2015, entitled "Adjustable Strap System for Head-Mounted Displays," which claims priority to U.S. Provisional Patent Application Ser. No. 62/180,008, filed Jun. 15, 2015, entitled "Adjustable Strap System for Head-Mounted Displays," which applications are incorporated by reference in their entirety.

TECHNICAL FIELD

This application relates generally to wearable technology and virtual reality technology, including but not limited to an adjustable strap system for a head-mounted display system.

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

However, it may be difficult for a user to properly adjust and comfortably wear the head-mounted displays and the integrated audio systems using existing technology, which may negatively affect the user's experience.

SUMMARY

The embodiments of the present disclosure provide a strap system for a head-mounted display system. In accordance with some embodiments, the strap system includes a rigid bar with a lateral slot and a vertical slot. The lateral slot opens at a first end of the rigid bar and extends within the rigid bar in a lateral dimension. The vertical slot is situated on an outer surface of the rigid bar. The strap system also includes a semi-rigid segment and a rigid segment. The rigid segment includes a first end to fixedly couple to the semi-rigid segment and a second end opposite to the first end. The second end of the rigid segment inserts into the lateral slot from the first end of the rigid bar. The strap system further includes one or more compression springs coupled to the rigid segment, and a shuttle to press against the one or more compressions spring so as to slide along the lateral dimension. The strap system also includes an adjustment strap fixedly coupled to the shuttle and extending beyond the second end of the rigid segment and through the vertical slot on the rigid bar. The adjustment strap includes a first coupling structure to adjustably couple to the outer surface of the rigid bar.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

Like reference numerals refer to corresponding parts throughout the several views of the drawings.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
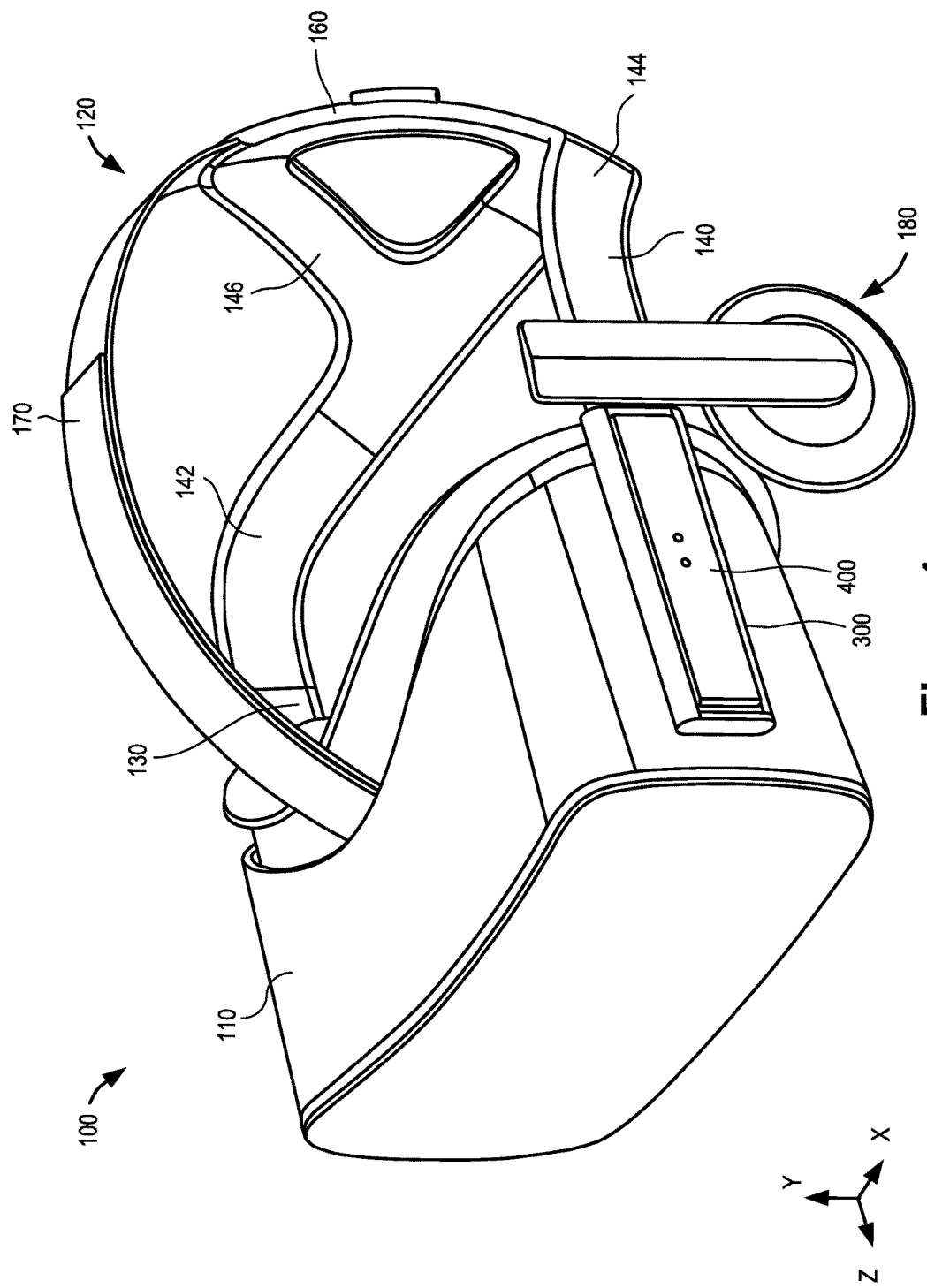
FIG. 1 is a perspective view of a head-mounted display system in accordance with some embodiments.

FIG. 1 is a perspective view of a head-mounted display system 100 in accordance with some embodiments. In some embodiments, the head-mounted display system 100 includes a head-mounted display 110, a strap system 120, and a detachable audio subsystem 180. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap system 120.

Figure 2:
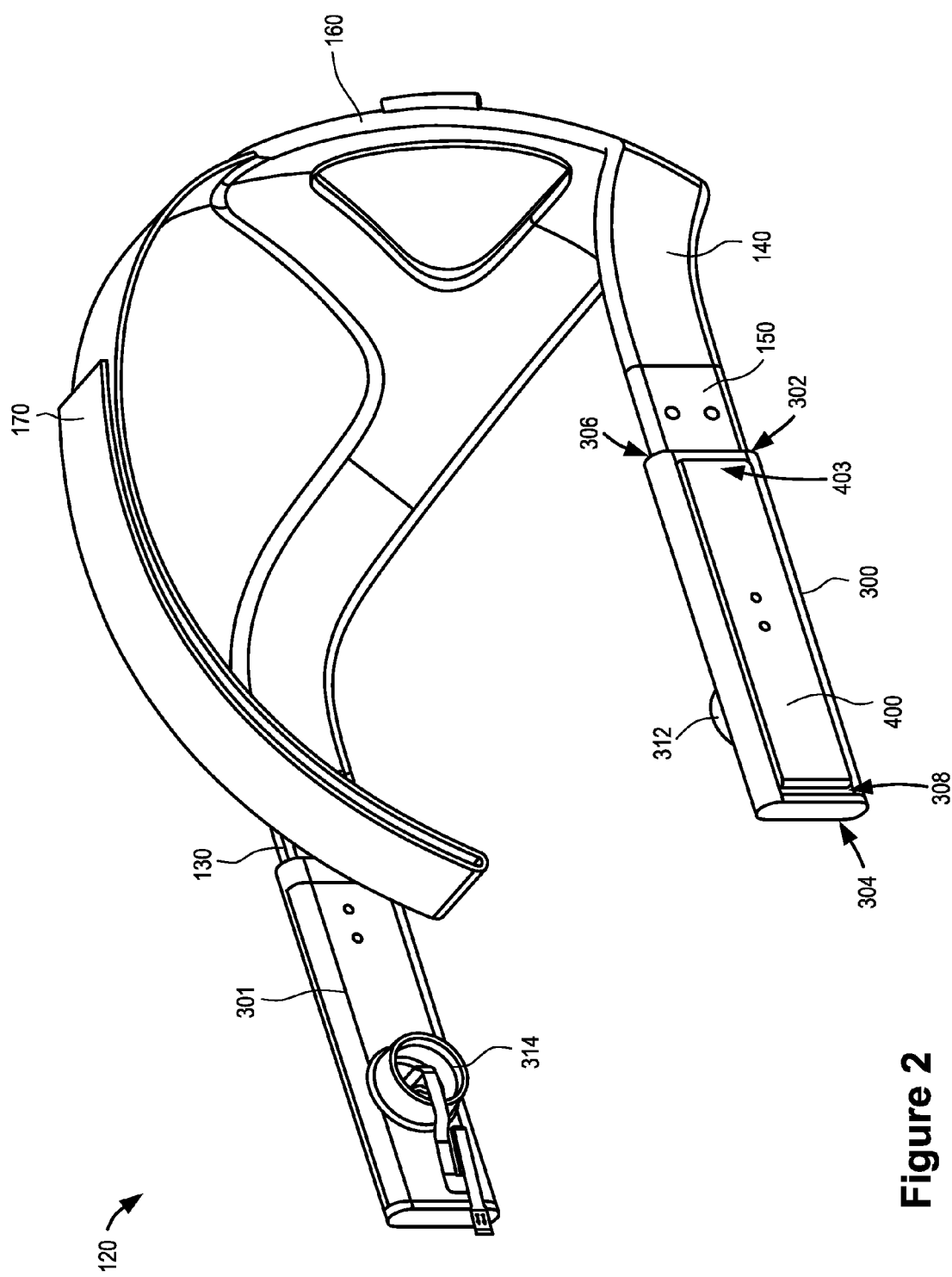
FIG. 2 is a perspective view of a strap system for a head-mounted display system in accordance with some embodiments.

FIG. 2 is a perspective view of the strap system 120 for the head-mounted display system 100 in accordance with some embodiments. The strap system 120 is used for mounting the head-mounted display 110 on a user's head. In the example of FIGS. 1-2, the strap system 120 comprises a rigid segment 130, a semi-rigid segment 140, and a rigid segment 150 (FIG. 2) that are coupled to each other to adjustably wrap around side and back portions of the user's head.

In some embodiments, the strap system 120 comprises a single and continuous semi-rigid segment 140 including two arc portions, and each arc portion is to extend from above a user's ears to below the user's occipital lobe to conform to a portion of the user's head.

For example, the semi-rigid segment 140 includes an arc portion 142 to extend from above a user's right ear to below the user's occipital lobe, and an arc portion 144 to extend from above the user's left ear to below the user's occipital lobe. The arc portions 142 and 144 extend respectively to form a back portion 146 of the semi-rigid segment 140 that rests against the user's occipital lobe.

In some embodiments, the rigid segments 130 and 150 are respectively connected to the semi-rigid segment 140 (FIG. 2). The rigid segments 130 and 150 are positioned on respective sides of the user's head to extend along the lateral dimension (e.g., the Z dimension in FIG. 1).

In some embodiments, the strap system 120 comprises a back piece 160 coupled with the semi-rigid segment 140 (e.g., a back portion 146 of the semi-rigid segment) to rest against the back of the user's head (e.g., around the user's occipital lobe). For example as shown in FIG. 1, the back piece 160 has a triangular shape with a hollow and triangular center. The semi-rigid piece 140 extends to wrap around a portion at the back of the user's head (e.g., around the user's occipital lobe). In some embodiments, the back portion 146 of the semi-rigid piece 140 conforms to the shape of the back piece 160 and the back piece 160 is coupled to (or inserted into) the back portion 146 of the semi-rigid piece 140 at the back of the user's head.

In some embodiments, the strap system 120 comprises a top strap 170 coupled to the back piece 160 (or the back portion 146 of the semi-rigid segment 140) and the head-mounted display 110 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management, signal transmission, and/or other functionalities to the head-mounted display 110 and the detachable audio subsystem 180. For example, the head-mounted display 110 is integrated with the detachable audio subsystem 180 using suitable electrical connection mechanisms to provide both visual and audio virtual-reality experiences to the user.

In some embodiments, the strap system 120 further includes a rigid bar 300 and a rigid bar 301 that substantially mirrors (e.g., to within manufacturing tolerances) the structure of the rigid bar 300. The rigid bars 300 and 301 are positioned on respective sides of the user's head to extend along the lateral dimension (e.g., the Z dimension in FIG. 1). As shown in FIG. 2, the rigid bar 300 includes a lateral slot 306 and a vertical slot 308. The lateral slot 306 opens at an end 302 of the rigid bar 300 and extends within the rigid bar 300 in the lateral dimension. The rigid segment 150 is inserted into the lateral slot 306 from the end 302 of the rigid bar 300. The vertical slot 308 is situated on an outer surface of the rigid bar 300 and extends along a vertical dimension (e.g., the Y dimension in FIG. 1). Similarly, the rigid segment 130 is inserted into a later slot from an end of the rigid bar 301 as shown in FIG. 2. The detachable audio subsystem 180 is coupled to the rigid segment 150 and positioned adjacent to the rigid bar 300.

As shown in FIG. 2, the rigid bar 300 includes an end 304 opposite to the end 302 and the end 304 is closed. In some examples, the vertical slot 308 is situated at any other suitable position on the outer surface of the rigid bar 300 (e.g., a position close to the end 304 of the rigid bar 300). Alternatively, the vertical slot 308 is on the end 304.

In some embodiments, the rigid bar 300 includes a coupling structure 312 on an inner surface to couple to a head-mounted display (e.g., the head-mounted display 110). The coupling structure 312 on the rigid bar 300 (e.g., the left rigid bar) substantially mirrors the coupling structure 314 situated on the rigid bar 301 (e.g., the right rigid bar). For example, the coupling structure 312 includes a cylinder with a hollow center to receive a protrusion from the head-mounted display 110.

In some embodiments, once the rigid bar 300 and the rigid bar 301 are coupled to the head-mounted display 110 from two sides, the rigid bar 300 and the rigid bar 301 are secured with the head-mounted display 110, thus the rigid bars are static relative to the head-mounted display 110.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Various embodiments of the detachable audio subsystem 180 and coupling mechanisms between the detachable audio subsystem 180 and the head-mounted display system 100 are described in U.S. patent application Ser. No. 14/627,639, filed on Feb. 20, 2015, U.S. Provisional Patent Application No. 62/174,298, filed on Jun. 11, 2015, and U.S. Provisional Patent Application No. 62/174,359, filed on Jun. 11, 2015, the disclosures of which are incorporated herein by reference in their entireties.

Various embodiments of the head-mounted display 110 are described in U.S. Provisional Patent Application No. 62/175,877, filed on Jun. 15, 2015, and U.S. Provisional Patent Application No. 62/175,919, filed on Jun. 15, 2015, the disclosures of which are incorporated herein by reference in their entireties.

Figure 3:
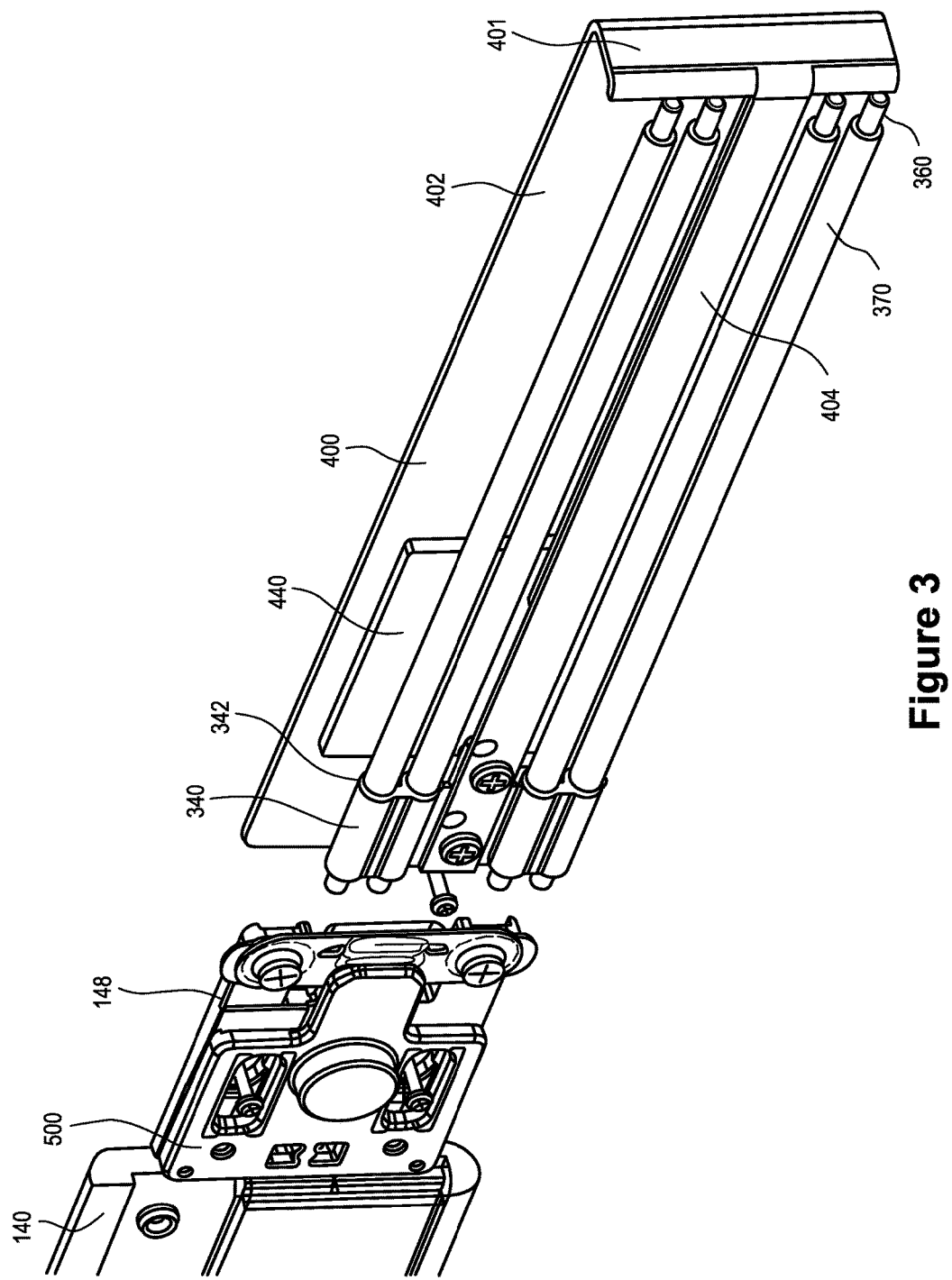
FIGS. 3-4 are perspective views illustrating components of a strap system for a head-mounted display system in accordance with some embodiments.
Figure 4:
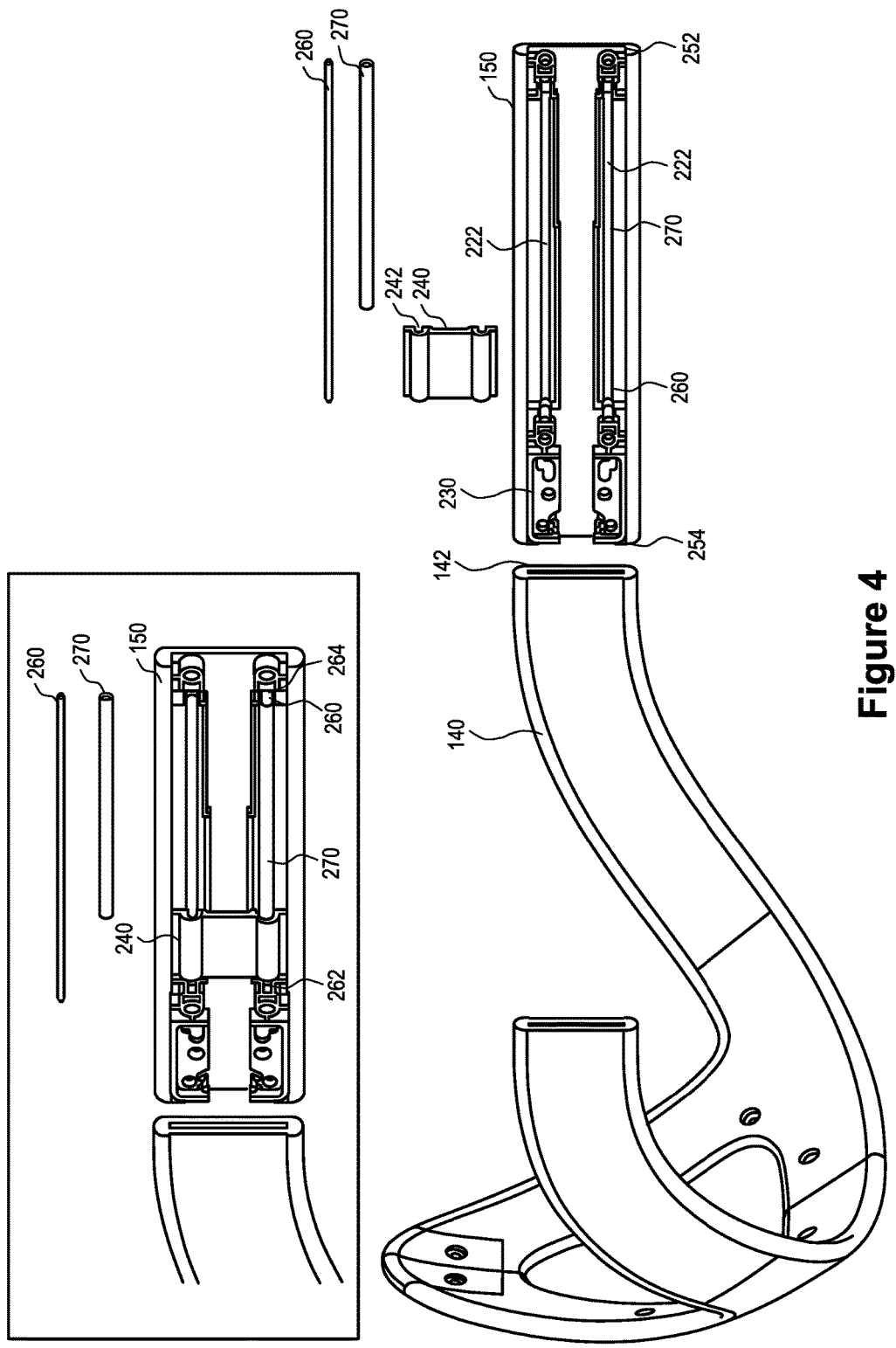

FIGS. 3-4 are perspective views illustrating components of the strap system 120 for the head-mounted display system 100 in accordance with some embodiments. As shown in FIG. 4, the rigid segment 150 includes an end 254 to fixedly couple to the semi-rigid segment 140 and an end 252 opposite to the end 254. Referring to FIGS. 2 and 4, the end 252 of the rigid segment 150 is inserted into the lateral slot 306 from the end 302 of the rigid bar 300.

As shown in FIGS. 3-4, the strap system 120 also includes one or more compression springs (e.g., four compression springs 370 in FIG. 3, two compression springs 270 in FIG. 4, or any other suitable number) coupled to the rigid segment 150.

The strap system 120 further includes a shuttle (e.g., the shuttle 340 in FIG. 3 or the shuttle 240 in FIG. 4) to press against the one or more compression springs so as to slide along the lateral dimension.

As illustrated in FIGS. 2-4, the strap system 120 includes an adjustment strap 400 (e.g., position adjustment strap) fixedly coupled to the shuttle (e.g., shuttle 340, FIG. 3; shuttle 240, FIG. 4) and extending beyond the end 252 of the rigid segment 150 (e.g., FIG. 4) and through the vertical slot 308 (e.g., FIG. 2) on the rigid bar 300. As shown in FIG. 3, the adjustment strap 400 includes a coupling structure 440 to adjustably couple to the outer surface of the rigid bar 300.

As shown in FIG. 4, the rigid segment 150 includes one or more grooves 222 on an inner surface of the rigid segment 150. The one or more grooves 222 accommodate the one or more compression springs (e.g., the compression springs 270).

As shown in FIGS. 3-4, the strap system 120 further includes one or more rails (e.g., four rails 360 in FIG. 3 or two rails 260 in FIG. 4) surrounded by the one or more compression springs (e.g., four compression springs 370 in FIG. 3 or two compression springs 270 in FIG. 4). The strap system 120 can include any other suitable number of compression springs and rails.

As shown in FIG. 4, each rail 260 includes two ends 262 and 264 connected to the inner surface of the rigid segment 150. Each rail 260 is inserted through a hollow center of a corresponding compression spring 270 to support the corresponding compression spring. Each rail 260 and the corresponding compression spring 270 surrounding the rail 260 are situated within the groove 222 of the one or more grooves. (Alternatively, the ends 262 and 264 of each rail 260 rest in respective grooves.) The rails 360 and the compression springs 370 (FIG. 3) are similarly situated.

The shuttle includes one or more openings. For example, the shuttle 340 (FIG. 3) includes one or more openings 342. A portion of each rail 360 is inserted into a corresponding opening 342 of the shuttle 340 to slidably mount the shuttle 340 on the one or more rails 360. The portion of the rail 360 inserted into the shuttle 340 is not surrounded by the compression spring 370 and the shuttle 340 is positioned next to the one or more compression springs 370 to compress the one or more compression springs 370 along the lateral dimension when sliding. Likewise, the shuttle 240 compresses the one or more compression springs 270 along the lateral dimension when sliding. The shuttle can slide relative to the rigid segment 150.

In some embodiments, the openings 342 of the shuttle 340 are holes as shown in FIG. 3. In some other embodiments, the openings 242 of the shuttle 240 are grooves as illustrated in FIG. 4.

Referring to FIG. 3, in some embodiments the adjustment strap 400 includes a portion 404 and a portion 402 connected to the portion 404. The portion 404 is accommodated by the rigid segment; for example, the portion 404 is situated between the upper rails and the lower rails. The portion 402 is wider than the portion 404. The portion 402 includes the coupling structure 440 to adjustably couple to the outer surface of the rigid bar 300.

In some embodiments, the outer surface of the rigid bar 300 includes a first layer of a hook-and-loop fastener. The second portion 402 of the adjustment strap 400 couples to the outer surface of the rigid bar 300 using a second layer of the hook-and-loop fastener. For example, the coupling structure 440 is the second layer of the hook-and-loop fastener.

In some embodiments as shown in FIG. 3, the adjustment strap 400 is screwed to the shuttle 340 to fixedly connect to the shuttle 340. For example, an end of the portion 404 of the adjustment strap 400 is screwed to the shuttle 340.

In some embodiments as shown in FIG. 3, a connecting member 500 is coupled to the semi-rigid segment 140. The connecting member 500 is further rigidly connected to the rigid segment 150 (e.g., the receiving structure 230 on the rigid segment 150 in FIG. 4) such that the semi-rigid segment 140 is fixedly connected to the rigid segment 150.

As shown in FIGS. 3-4, the rigid segment 150 includes one or more screw holes on an inner surface of the rigid segment 150. The connecting member 500 is fixedly coupled to the one or more screw holes on the rigid segment 150.

In some embodiments, the connecting member 500 is coupled to a protrusion 148 of the semi-rigid segment 140 extending toward the rigid segment 150. The shuttle is situated between the connecting member 500 and the one or more compression springs 370.

The strap system 120 as discussed in the present disclosure offers various adjusting modes. In one adjusting mode, the user pulls on adjustment strap 400 and secures it to the coupling structure (e.g., the hook-and-loop fastener) to adjust the overall position of the strap system 120. In some embodiments, this adjustment can be performed either before or after a user mounts the head-mounted display system 100 on the user's head. For example, this adjustment can be done off-head.

In some embodiments, the user pulls an end 403 (FIG. 2) of the adjustment strap 400 and without loading the compression springs 370, the user can select a desired position and secure the adjustment strap 400 to the outer surface of the rigid bar 300 (e.g., using the hook-and-loop fasteners).

In some embodiments, the position is adjusted with loading the compression springs 370. For example, when the user pulls an end 403 of the adjustment strap 400 (FIG. 2), the adjustment strap 400 pulls the shuttle 340 to slide to compress the compression springs 370 (FIG. 3). A portion 401 (FIG. 3) of the adjustment strap 400 presses against the end 252 (FIG. 4) of the rigid segment 250 and slides through the vertical slot 308 of the rigid bar 300 (FIG. 2) while the user pulls the adjustment strap 400. The portion 401 of the adjustment strap 400 pushes the rigid bar 300 backward as the shuttle 340 slides to compress the compression springs 370. The shuttle 340 slides relative to the rigid segment 150 until the user has selected a desired position of the rigid bar 300. The user can couple the adjustment strap 400 (e.g., the coupling structure 440) on the outside surface of the rigid bar 300 to lock or secure the desired position.

In another adjustment mode, the position adjustment is performed by spring loaded travel, which allows the head-mounted display 110 to be easily pulled off the user's face and released back onto the user's face. With the adjustment strap 400 secured to the rigid bar 300, any pull force on the head-mounted display 110 (e.g., the user pulling the head-mounted display 110 forward off of his face) will cause the compression springs 370 to be compressed. This is because the shuttle 340 is fixed relative to the rigid bar 300 via the adjustment strap 400.

For example, after the head-mounted display system 100 is mounted on the user's head and after the adjustment strap 400 is secured on the outside surface of the rigid bar 300 (and another adjustment strap is secured on the outside surface of the rigid bar 301), the user can further adjust the relative position between the rigid segment 150 (and the rigid segment 130) and the head-mounted display 110 by pulling the head-mounted display 110 forward.

When the user pulls the head-mounted display 110 forward, because the head-mounted display 110 is coupled to the rigid bar 300, the rigid bar 300 also moves forward. As the adjustment strap 400 is secured on the rigid bar 300, the rigid bar 300 pushes against the portion 401 of the adjustment strap 400 such that the portion 404 of the adjustment strap 400 is dragged forward (FIG. 3). The portion 404 of the adjustment strap 400 further drags the shuttle 340 to slide forward relative to the rigid segment 150 and compress the compression springs 370. The user can adjust the head-mounted display 110 to a desired position in this mode and lock the final position by pressing/releasing the head-mounted display 100 against the user's face.

Although not shown, the rigid bar 301 in FIG. 2 includes structures mirroring the structures of the rigid bar 300 as discussed in the present disclosure. The rigid bar 301 can slide relative to the rigid segment 130 using a substantially similar mechanism as the rigid bar 300 relative to the rigid segment 150. The strap system 120 further includes an adjustment strap (not shown) mirroring the adjustment strap 400 which can be adjustably coupled to the rigid bar 301. In some embodiments, the rigid bar 301 and the rigid bar 300 are adjusted (e.g., simultaneously) relative to the rigid segment 130 and the rigid segment 150 to adjustably fit the head-mounted display 110 on a user's head.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A strap system for a head-mounted display system, the strap system comprising:
   a rigid bar having an opening at a first end and a vertical slot situated on an outer surface of the rigid bar, wherein the opening extends within the rigid bar in a lateral dimension;
   a rigid segment including an end inserted into the opening of the rigid bar in the lateral dimension;
   one or more compression springs coupled to the rigid segment;
   a shuttle to press against the one or more compression springs so as to slide along the lateral dimension; and
   an adjustment strap fixedly coupled to the shuttle and extending beyond the end of the rigid segment and through the vertical slot on the rigid bar.

2. The strap system of claim 1, wherein the rigid bar includes a second end opposite to the first end of the rigid bar, the second end being closed.

3. The strap system of claim 1, wherein an inner surface of the rigid bar is coupleable to a head-mounted display.

4. The strap system of claim 3, wherein the rigid bar includes, on the inner surface, a cylinder with a hollow center to receive a protrusion from the head-mounted display.

5. The strap system of claim 1, wherein the rigid segment includes one or more grooves on an inner surface of the rigid segment, the one or more grooves to accommodate the one or more compression springs.

6. The strap system of claim 5, further comprising one or more rails surrounded by the one or more compression springs, each rail of the one or more rails including two ends connected to the inner surface of the rigid segment, and each rail of the one or more rails situated within a groove of the one or more grooves.

7. The strap system of claim 6, wherein the shuttle includes one or more openings, each rail inserted into a corresponding opening of the shuttle to slidably mount the shuttle on the one or more rails, the shuttle to compress the one or more compression springs along the lateral dimension when sliding.

8. The strap system of claim 1, wherein the adjustment strap includes:
   a first portion accommodated by the rigid segment and;
   a second portion, wider than the first portion, to adjustably couple to the outer surface of the rigid bar.

9. The strap system of claim 8, wherein:
   the outer surface of the rigid bar includes a first layer of a hook-and-loop fastener; and
   the second portion of the adjustment strap couples to the outer surface of the rigid bar using a second layer of the hook-and-loop fastener.

10. The strap system of claim 1, wherein the adjustment strap is screwed to the shuttle.

11. The strap system of claim 1, wherein the end of the rigid segment inserted into the opening of the rigid bar is a first end of the rigid segment, the strap system further comprising:
    a semi-rigid segment; and
    a connecting member coupled to the semi-rigid segment and rigidly connected to a second end of the rigid segment, wherein the second end of the rigid segment is opposite to the first end of the rigid segment.

12. The strap system of claim 11, wherein:
    the rigid segment includes one or more screw holes on an inner surface of the rigid segment; and
    the connecting member is fixedly coupled to the one or more screw holes on the rigid segment.

13. The strap system of claim 11, wherein the connecting member is coupled to a protrusion of the semi-rigid segment extending toward the rigid segment.

14. The strap system of claim 11, wherein the shuttle is situated between the connecting member and the one or more compression springs.

15. The strap system of claim 1, wherein the opening at the first end of the rigid bar is an opening of a lateral slot extending within the rigid bar in a lateral dimension.

* * * * *